R. E. Haines,
Glass Mold.
N° 64,312.    Patented Apr. 30, 1867.
Fig: 1.
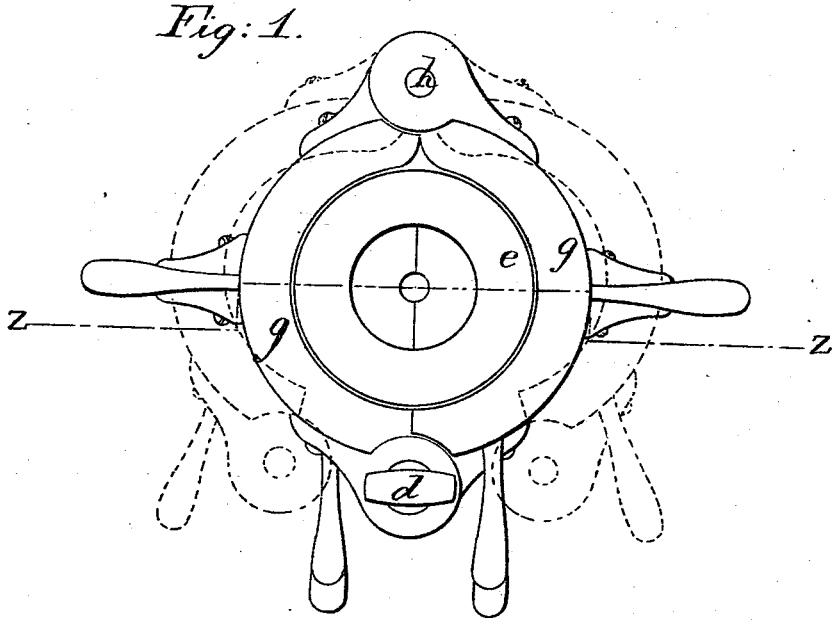
Fig: 2.
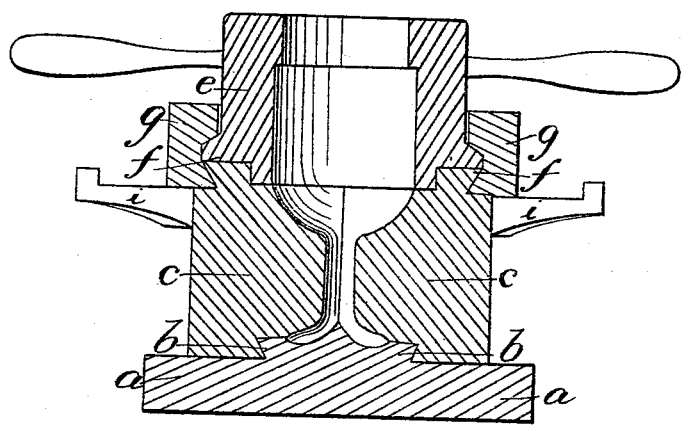
Witnesses;
S. B. Kidder.
M. W. Frothingham
Inventor;
R. E. Haines
Crosby & Gould
Attys.

United States Patent Office.

ROBERT E. HAINES, OF CAMBRIDGE, ASSIGNOR TO BOSTON SILVER GLASS COMPANY, OF BOSTON, MASSACHUSETTS.

Letters Patent No. 64,312, dated April 30, 1867.

---

IMPROVED GLASS-WARE MOULDS.

---

The Schedule referred to in these Letters Patent and making part of the same.

---

TO ALL WHOM IT MAY CONCERN:

Be it known that I, ROBERT E. HAINES, of Cambridge, in the county of Middlesex, and State of Massachusetts, have invented a new and useful improvement in the Construction of Moulds for Forming Glass-Ware; and I do hereby declare that the following, taken in connection with the drawings which accompany and form part of this specification, is a description of my invention sufficient to enable those skilled in the art to practise it.

In moulds for forming ware of molten glass by pressure into articles like common goblets, for example, it has long been a desideratum to attain a way of securing the upper to the lower part of the mould, in such a manner as to be convenient in manipulation, simple in structure, and efficient in operation. It is to the peculiar arrangement of parts by which I effect this desired result that my invention relates. Referring to the drawings for an example of an embodiment of my invention—

Figure 1 shows in plan an ordinary goblet mould with my improvement applied thereunto, exhibiting in two positions the parts connected with my invention.

Figure 2 is a section taken in the line $z\,z$ seen in fig. 1.

$a$ is the base-plate, having a circular flaring projection, $b$, to which the two hinged lower parts $c\,c$ are locked, a cavity in their lower parts corresponding in size and shape to said projection, so that when the said parts $c\,c$ are brought together on the base-plate; and the lock-pin $d$ is inserted in the holes in the ears, which are fixed on each part $c\,c$, the lower part of the mould is complete. The upper part of the mould is marked $e$, and is made whole, fitting, with an annular projection, a corresponding cavity made in the parts $c\,c$, as seen in fig. 2, the parts $c\,c$ and the part $e$ of the mould being formed, at the juncture of said parts, with inclined collars projecting from the perimeter thereof, as seen in fig. 2 at $f\,f$, so that when these are clamped in a groove of corresponding form made in the hinged clasp $g$, the part $e$ is firmly locked to the parts $c\,c$, and except by breakage cannot be separated therefrom so long as the parts of the hinged clasp are connected. The hinge-pin $h$, on which the parts $c\,c$, of the mould turn, serves by its upward extension for the hinge-pin of the clasps $g$, while the lock-pin $d$, made a little longer than usual, passes through holes made in ears forming part of the clasps $g$, and unites them at the same time that it unites the parts $c\,c$. On the parts $c\,c$ are bracket-like pieces, $i\,i$, which serve to support the clasps $g\,g$ when unlocked, by removal of pin $d$, and swing outward, as seen in red lines in fig. 1, preparatory to the removal of the upper part $e$ of the mould off from the glass which has been pressed therein. These brackets $i\,i$ have projections therefrom at their outer ends, which serve to check the clasp-pieces from too great extent of movement. When this has been done the lower parts $c\,c$ of the mould are swung outward, carrying with them the clasp $g\,g$, and the glass-ware is left standing on the projection $b$ from the base-plate, whence it is removed to be further treated and finished in well-known ways. The plunger which is forced into the mould upon the molten glass operates and is operated in the usual well-known manner. Without any means for holding the upper to the lower part of the mould, said parts would separate from each other in the operation of forming the ware, and means have been employed for the purpose of confining the parts of the mould together prior to my invention, so that I do not claim broadly means for uniting the upper and lower parts of glass-ware moulds.

I am aware that in several instances the upper sections of glass-moulds have been connected to the sections beneath by constructing said upper sections in halves hinged together, and provided with inclined or dove-tailed grooves fitting or corresponding to inclined or dove-tailed projections made on the lower sections. But in my invention the upper section of my mould is made whole, and not in halves hinged together, and said section is confined to the section beneath by means of hinged-clasping bands suitably formed with reference to the formation of the perimeters of the upper and lower sections at their juncture.

I claim the employment of hinged-clasping bands, constructed and arranged to operate substantially as described, to hold the upper section, when made whole, of a glass-ware mould to lower sections thereof when made in parts.

ROBERT E. HAINES.

Witnesses:
J. B. CROSBY,
FRANCIS GOULD.